United States Patent
Osborn et al.

(10) Patent No.: US 12,354,032 B1
(45) Date of Patent: Jul. 8, 2025

(54) VEHICLE SHARING OPTIMIZATION

(71) Applicant: Allstate Insurance Company, Northbrook, IL (US)

(72) Inventors: Michael Osborn, Northbrook, IL (US); Surender Kumar, Palatine, IL (US)

(73) Assignee: Allstate Insurance Company, Northbrook, IL (US)

( * ) Notice: Subject to any disclaimer, the term of this patent is extended or adjusted under 35 U.S.C. 154(b) by 433 days.

(21) Appl. No.: 16/776,954

(22) Filed: Jan. 30, 2020

(51) Int. Cl.
| | |
|---|---|
| *G06Q 50/40* | (2024.01) |
| *G01C 21/34* | (2006.01) |
| *G01W 1/10* | (2006.01) |
| *G06N 20/00* | (2019.01) |
| *G06Q 10/02* | (2012.01) |
| *G06Q 30/0645* | (2023.01) |
| *G08G 1/00* | (2006.01) |

(52) U.S. Cl.
CPC ......... *G06Q 10/02* (2013.01); *G01C 21/3438* (2013.01); *G01C 21/3492* (2013.01); *G01W 1/10* (2013.01); *G06N 20/00* (2019.01); *G06Q 30/0645* (2013.01); *G06Q 50/40* (2024.01); *G08G 1/202* (2013.01)

(58) Field of Classification Search
CPC ........ G06Q 10/02; G06Q 50/30; G06Q 50/40; G08G 1/20
See application file for complete search history.

(56) References Cited

U.S. PATENT DOCUMENTS

| | | | |
|---|---|---|---|
| 6,317,720 B1 | 11/2001 | Murakami et al. | |
| 7,840,427 B2 | 11/2010 | O'Sullivan | |
| 8,671,063 B2 | 3/2014 | Ehrman et al. | |
| 9,792,575 B2 | 10/2017 | Khasis | |
| 10,127,519 B2 | 11/2018 | Walton | |
| 10,331,124 B2 | 6/2019 | Ferguson et al. | |
| 10,504,366 B1 * | 12/2019 | Dagley | G08G 1/144 |
| 2011/0231354 A1 | 9/2011 | O'Sullivan et al. | |
| 2011/0288891 A1 * | 11/2011 | Zaid | G06Q 30/0611 |
| | | | 705/26.4 |
| 2015/0142518 A1 | 5/2015 | Felix | |
| 2015/0242944 A1 | 8/2015 | Willard et al. | |
| 2017/0098181 A1 | 4/2017 | Herman et al. | |
| 2017/0270447 A1 | 9/2017 | Borean et al. | |

(Continued)

FOREIGN PATENT DOCUMENTS

| | | |
|---|---|---|
| CN | 105719019 A | 6/2016 |
| JP | H09153098 A | 6/1997 |
| WO | 2019110584 A1 | 6/2019 |

OTHER PUBLICATIONS

Clemente, Monica, et al. "A decision support system for user-based vehicle relocation in car sharing systems." IEEE Transactions on Systems, Man, and Cybernetics: Systems 48.8 (2017): 1283-1296. (Year: 2017).*

(Continued)

*Primary Examiner* — Scott M Tungate (57) ABSTRACT

Methods, computer-readable media, software, and apparatuses may determine that an expected vehicle demand will exceed an expected supply in a vehicle sharing application. In order to meet the demand, one or more users may be contacted with a request to provide a vehicle for sharing on a particular date. A machine learning algorithm may be used in determining that the expected vehicle demand will exceed the expected vehicle supply.

16 Claims, 5 Drawing Sheets

(56) References Cited

U.S. PATENT DOCUMENTS

| | | | |
|---|---|---|---|
| 2018/0032928 A1 | 2/2018 | Li et al. | |
| 2018/0276695 A1 | 9/2018 | Dione | |
| 2018/0341895 A1 | 11/2018 | Kislovskiy et al. | |
| 2019/0130425 A1 | 5/2019 | Lei et al. | |
| 2019/0197798 A1 | 6/2019 | Abari et al. | |
| 2019/0204097 A1 | 7/2019 | Starns | |
| 2019/0205796 A1 | 7/2019 | Dutta et al. | |
| 2019/0266623 A1 | 8/2019 | Sakurada | |
| 2019/0340543 A1* | 11/2019 | Gerenstein | G08G 1/202 |
| 2020/0133306 A1* | 4/2020 | Chadha | G08G 1/00 |
| 2020/0286020 A1* | 9/2020 | Kobayashi | G06Q 50/40 |
| 2021/0341299 A1* | 11/2021 | Weng | G06Q 10/04 |

OTHER PUBLICATIONS

Powering the World's Top Brands in Carsharing, https://ridecell.com/solutions/carsharing, Sep. 4, 2019, pp. 1-11.

The First Ever Vehicle as a Service Platform for Fleets, https://www.autofleet.io, Sep. 4, 2019, pp. 1-5.

Uber vs. Lyft: How the Rivals Approach Cloud, AI, and Machine Learning, https://www.zdnet.com/article/uber-vs-lyft-how-the-rivals-approach-cloud-ai-machine-learning, Sep. 4, 2019, pp. 1-12.

Demand Prediction—Or Who Needs a Car2Go When?, https://blog.car2go.com/2017/12/16/demand-prediction-needs-car2go/, Sep. 4, 2019, 8 pages.

Wang, et al., "Deepsd: Supply-Demand Prediction for Online Car-Hailing Services Using Deep Neural Networks", Institute for Interdisciplinary Information Sciences, Tsinghua University, http://www.xiaojukeji.com/en/index.html, 12 pages.

* cited by examiner

VEHICLE SHARING OPTIMIZATION

FIELD OF ART

Aspects of the disclosure generally relate to methods and computer systems, including one or more computers particularly configured and/or executing computer software. More specifically, aspects of this disclosure relate to methods and systems for optimizing the sharing of vehicles in a peer-to-peer vehicle sharing service.

BACKGROUND

In a peer-to-peer vehicle sharing service, users who have a vehicle may make their vehicle available to the vehicle sharing service, so that the vehicle may be rented by another user, who wants to borrow such a vehicle. Demand for vehicle rental in a peer-to-peer vehicle sharing service is currently matched with the supply available at a same (e.g., within a predefined proximity) location. The demand and supply for rental vehicles may vary by location, vehicle type, day of the week, month of the year, parking space capacity at a location, rental duration, weather forecast, and proximity of a location to major events (such as conferences, tourist attractions, and sporting events, etc.), among others. In addition, since vehicle supply depends on users making their vehicles available to the service, and since users often make their vehicle available without much advance notice, vehicle supply can be difficult to predict. Accordingly, current methods often result in excess supply or excess demand at various locations and for various vehicle types.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses to determine historical vehicle supply data representing vehicle sharing offers received from users, determine historical demand data representing vehicle borrowing requests, based on the historical vehicle supply data and based on the historical vehicle demand data, determine that, for a determined date, an expected vehicle demand will exceed an expected vehicle supply, and send, to at least one user, a request to provide a vehicle for sharing on the determined date.

In some aspects, the system may include at least one processor and a memory unit storing computer-executable instructions, which may include a machine learning algorithm. The machine learning algorithm may be configured to determine, based on the historical vehicle supply data and based on the historical vehicle demand data, that an expected vehicle demand will exceed an expected vehicle supply.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for determining, based on historical vehicle supply data, and based on historical vehicle demand data, that an expected vehicle demand will exceed an expected vehicle supply, and for sending, to at least one user, a request to provide a vehicle for sharing on the determined date.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
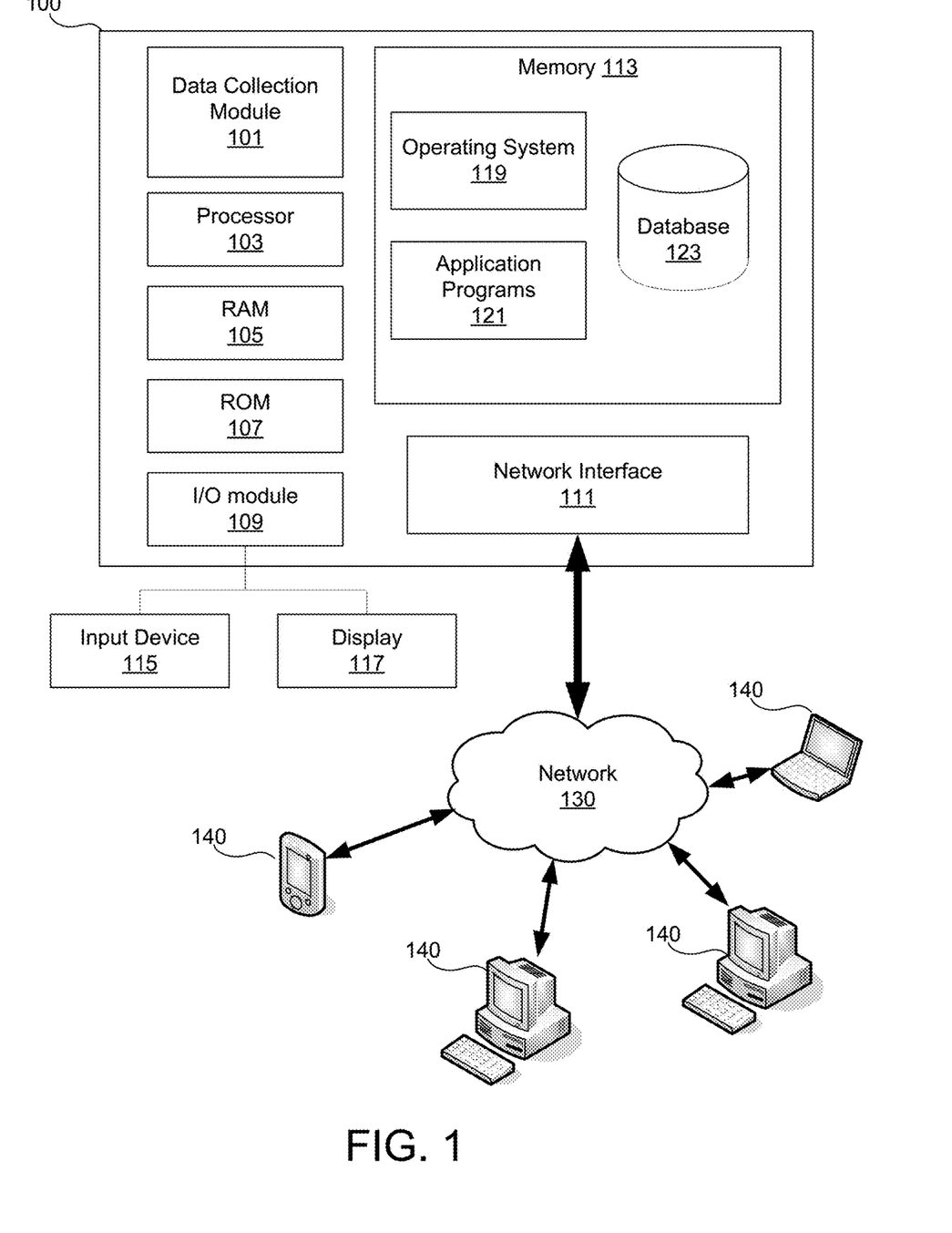
FIG. 1 illustrates an example computing device that may be used in accordance with one or more aspects described herein.

In one or more arrangements, aspects of the present disclosure may be implemented with a computing device. FIG. 1 illustrates a block diagram of an example computing device 100 that may be used in accordance with aspects described herein. The computing device 100 may be a server, personal computer (e.g., a desktop computer), laptop computer, notebook, tablet, smartphone, home management devices, home security devices, smart appliances, etc. The computing device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, computing device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the computing device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100; however, they may be within the same structure. On some computing devices 100, the input device 115 may be operated by users to interact with the data collection module 101, including providing user information and/or preferences, account information, vehicle sharing requests and/or offers, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 may allow the computing device 100 to connect to and communicate with a network 130. The network 130 may be any type of network, including a local area network (LAN) and/or a wide area network (WAN), such as the Internet, a cellular network, or a satellite network. Through the network 130, the computing device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
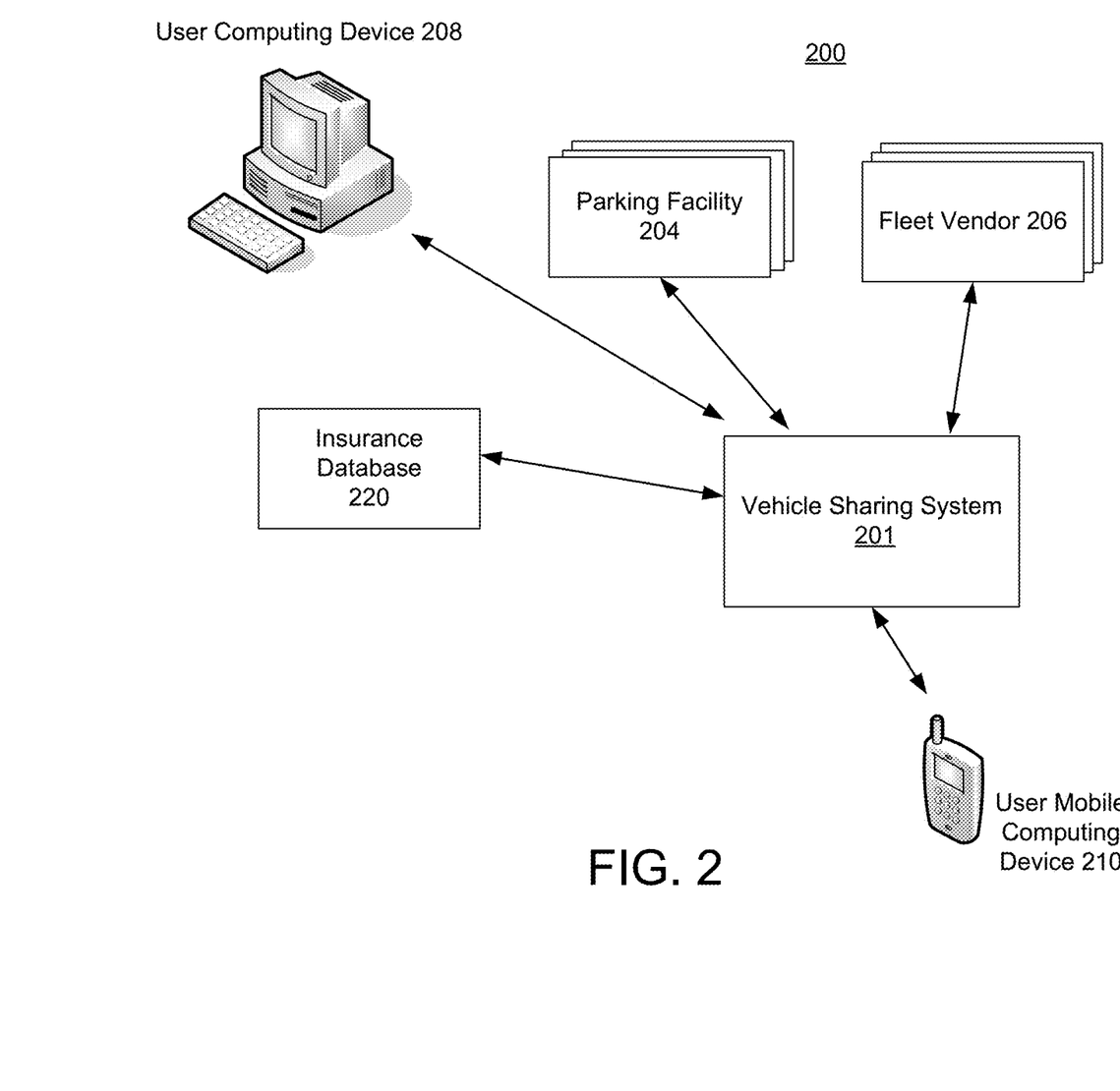
FIG. 2 is a diagram illustrating a vehicle sharing system in accordance with one or more aspects described herein.

FIG. 2 is a diagram 200 illustrating a vehicle sharing system in accordance with one or more aspects described herein. In some instances, the vehicle sharing system 201 may include one or more computing devices, such as computing device 100, or aspects similar to those discussed above with respect to computing device 100.

The vehicle sharing system 201 may collect information from, and transmit information to, a user through various channels, such as via a user mobile computing device 210, or via a user computing device 208 (e.g., via one or more public or private networks). In some embodiments, the vehicle sharing system 201 may receive a request from a user to rent a vehicle and may store information related to the request in memory or in a database, such as database 123 of FIG. 1. For example, a consumer may use a web browser, or other application, executing on user computing device 208 to send the request to vehicle sharing system 201. In some embodiments, the request may include information conveying an identity of the user, a type or class of vehicle wanted, a date for the rental, a duration for the rental, and one or more locations, such as a pickup location and a drop off location.

Upon receiving the request, vehicle sharing system 201 may determine whether a vehicle matching the type of vehicle requested is available for the date, duration, and/or location requested. For example, the vehicle sharing system 201 may determine that one or more vehicles matching the type requested are available and parked at the requested location (e.g., within a predefined distance of a location as determined or identified by longitude and latitude, zip code, physical address of a building or structure at the location, or the like). In some embodiments, the vehicle sharing system 201 may flag one of these vehicles as reserved and may prevent the reserved vehicle from being rented by other users. In some embodiments, the vehicle sharing system 201 may accept the user's request and store information related to the request in memory or in a database, such as database 123 of FIG. 1. In some other embodiments, the vehicle sharing system 201 may determine that a vehicle of the type requested is expected to be available on the date in the user's request.

In some examples, the vehicle sharing system 201 may determine expected vehicle supply and/or demand using a prediction algorithm, such as a machine learning algorithm, which will be discussed in more detail below.

In some arrangements, the vehicle sharing system 201 may offer a user a rental vehicle that is similar to a vehicle the user already owns, for example, when the user is making a reservation via the vehicle sharing system 201. In these arrangements, the vehicle sharing system 201 may refer to a component in an insurance system, such as insurance database 220, to determine what type of vehicle the user owns or insures and may offer a similar vehicle for rental. In some other embodiments, the vehicle sharing system 201 may offer a vehicle for rental that is an upgrade in comparison to the vehicle the user already owns. For example, the offered vehicle may be a luxury brand from the same manufacturer as the vehicle the user already owns.

In still other examples, the vehicle sharing system 201 may determine that a vehicle of the type requested is not expected to be available at the location and/or on the date in the user's request. In these embodiments, the vehicle sharing system 201 may cause a vehicle to be moved, either manually or automatically (e.g. in the case of autonomous vehicles) to the location to make it available as a rental to the user, may send a request for a vehicle to one or more fleet vendors 206, and/or may send a message requesting a vehicle to one or more other users, such as by sending email or text messages, for example to user mobile computing device 210 or to user computing device 208.

In some embodiments, the vehicle sharing system 201 may offer rewards or discounts in order to encourage a user to make sharing arrangements in advance of a planned sharing date. For example, the vehicle sharing system 201 may offer a user an increased rate of payment if they agree to share their vehicle, and the agreement is made at least two weeks ahead of the date that the vehicle will be made available for sharing.

In some example arrangements, the vehicle sharing system 201 may determine that a user keeps vehicles at multiple residences or other locations associated with the user, and may request or otherwise offer the user to share a vehicle normally kept at a first residence or location during a period when the user is away from the first residence or location. For example, the vehicle sharing system 201 may access an insurance database 220 to obtain information about the user, the residences or other locations at which vehicles associated with the user are frequently parked, vehicles that the user owns, and the locations of the vehicles.

In some embodiments, the vehicle sharing system 201 may determine that a user is a frequent traveler who often parks their vehicle at an airport. In these embodiments, the vehicle sharing system 201 may communicate with the user to encourage that user to offer their vehicle for sharing when it is parked at the airport. In some embodiments, the vehicle sharing system 201 may offer parking reimbursement, free car wash, or other incentives to encourage the user to provide their vehicle for sharing.

In some embodiments, the vehicle sharing system 201 may cause insurance charges related to a user's personal vehicle to be reduced while the user is borrowing a vehicle from the vehicle sharing system 201. For example, the vehicle sharing system 201 may access an insurance database 220 to obtain information about the user's owned vehicle and may cause a reduction in charges for their insurance during a period in which they borrow a vehicle from the vehicle sharing system 201. In these embodiments, the user's vehicle may be identified by a Vehicle Identification Number (VIN), and located in the insurance database 220 using the VIN. In some embodiments, the vehicle sharing system 201 may cause a user's personal vehicle insurance to be suspended, or paused, during the rental period.

In some examples, the vehicle sharing system 201 may communicate with sensors or computing devices associated with one or more parking facilities 204. In some embodiments, the sensors or computing devices associated with parking facilities 204 may provide parking capacity or current (e.g., real-time or near real-time) parking availability, such as a number of spaces available for parking. In some other embodiments, the sensors or computing devices associated with parking facilities 204 may provide information describing where a particular vehicle is parked. For example, a parking spot identifier, such as a sequence of numbers and/or letters, may be associated with a vehicle that is currently occupying the parking spot. This identifier, when provided to a user, may enable the user to more easily locate the vehicle for renting.

Figure 3:
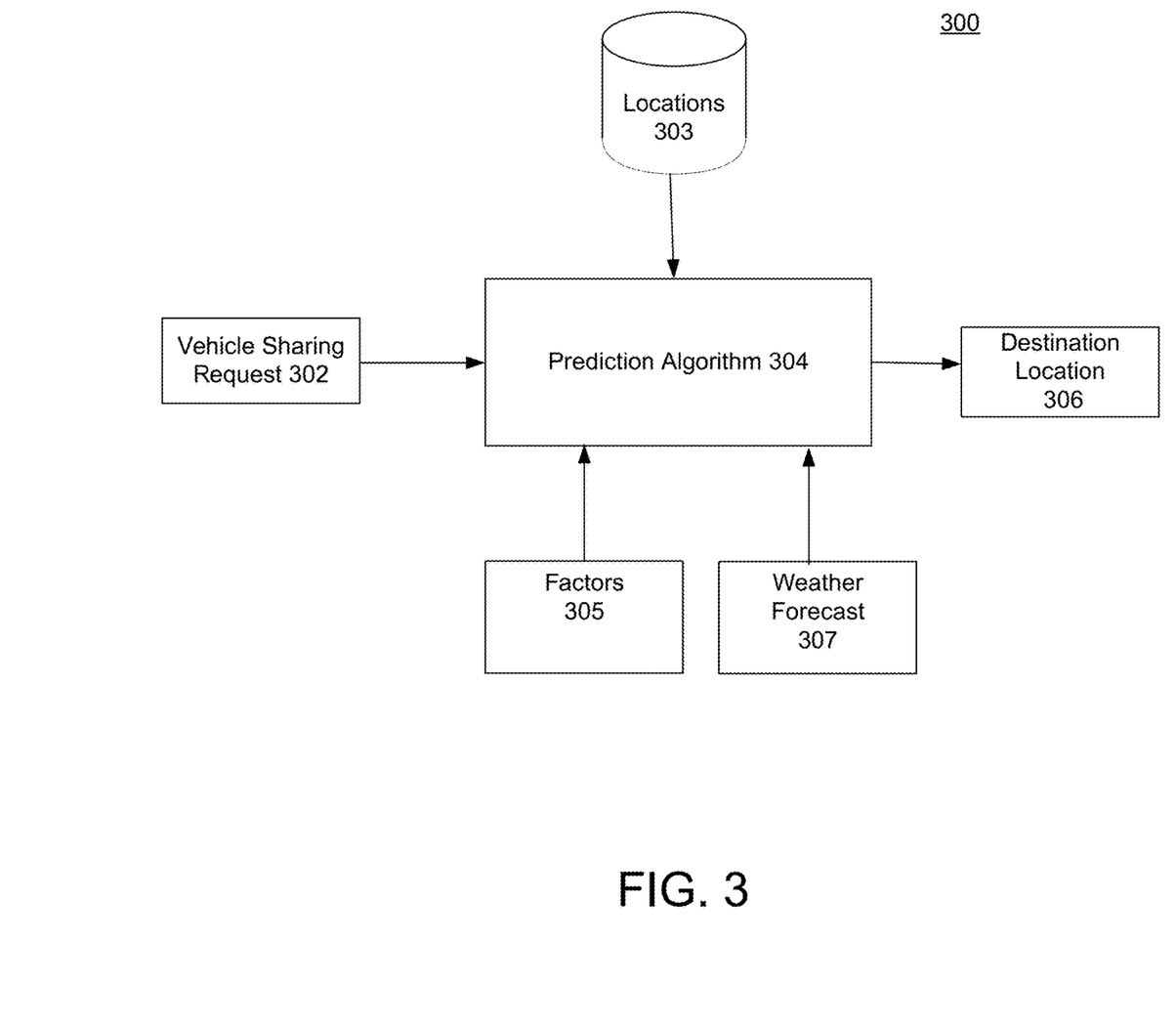
FIG. 3 is a block diagram of a vehicle sharing system in accordance with one or more aspects described herein.

FIG. 3 is a block diagram 300 depicting prediction algorithm 304 as in some embodiments of vehicle sharing system 201. As shown in FIG. 3, a vehicle sharing request 302, such as a request received from a user who wants to rent a vehicle, may be input to prediction algorithm 304, along with factors 305, weather forecast 307, and locations 303. In some embodiments, the locations 303 may include information identifying parking lots, spaces, or other parking facilities 204 where vehicles may be, or may have been, positioned for rental. For example, the vehicle sharing service may have been given permission or authorization to park vehicles in particular parking spaces or lots, and this information may identify those spaces or lots. Locations 303 may include information indicative of capacity and/or utilization at various parking locations. In some embodiments, the prediction algorithm 304 may consider the weather forecast 307 when determining vehicle supply, vehicle demand, and/or any gap between the vehicle supply and vehicle demand. For example, when determining vehicle demand for a location and date that coincides with an outdoor sporting event, the prediction algorithm 304 may account for weather and the effects weather may have on vehicle demand. Continuing the example, if a major snowstorm is expected to arrive hours before an outdoor soccer game, the prediction algorithm 304 may adjust predicted demand downward, since attendance at the game may be expected to be reduced due to the snowstorm and, as a result, fewer vehicles may be rented near the location. Similarly, users may be less likely to share their vehicles during a snowstorm, for example, due to concern about damage due to accidents on icy roads.

In various embodiments, the factors 305 may include historical demand rate data per location, vehicle type, duration, and/or day of the week/month of year; historical supply rate data per location, vehicle type, duration, and/or day of the week/month of year; expected capacity utilization data at the location per vehicle type, duration, and/or day of the week; expected supply rate data at the location per vehicle type, duration of rental, and/or day of the week; parking capacity at the location; expected demand rate due to major local/national level planned events near location (conferences/sporting events) per vehicle type, duration, and/or day of the event(s); and vehicle rental rates per location, day of the week, and/or month of the year, among others. In some embodiments, this information may be gathered/stored/provided by a data collection module of the vehicle sharing system 201 and similar to data collection module 101 of FIG. 1.

In some embodiments, the prediction algorithm 304 may determine a prediction for vehicle sharing at a location that optimizes capacity utilization and profitability. In some embodiments, prediction algorithm 304 may use machine learning to determine that a vehicle of the type requested is, or is not, expected to be available at the location on the date in the user's request. For example, prediction algorithm 304 may use supervised learning and employ supervised algorithms, such as linear regression, random forest, nearest neighbor, decision trees, Support Vector Machines (SVM), and/or logistical regression, among others. In some other examples, prediction algorithm 304 may use unsupervised learning and employ unsupervised algorithms, such as k-means clustering and/or association rules, among others. In still other examples, prediction algorithm 304 may use semi-supervised learning and/or reinforcement learning. Inputs to the machine learning algorithms may include information from locations 303, factors 305, weather forecast 307, and vehicle sharing requests 302. In some embodiments, the machine learning algorithm may identify methods to increase supply and/or reduce demand, such as suggested pricing/offers. For example, the machine learning algorithm may suggest a lower price on SUVs (Sport Utility Vehicles) if it is expected that an excess of SUVs will be available on a particular date at a particular location. In some embodiments, training of the machine learning algorithm may be based on information from the data collection module 101. For example, the machine learning algorithm may be trained on information collected over a period of time, including weather forecasts, factors 305, sharing requests 302, and information from various locations 303.

In some arrangements, the machine learning algorithm may perform supply/demand matching and/or profitability optimization. In some embodiments, the vehicle sharing system 201 may refuse a vehicle sharing offer from a user, for example, if demand is predicted to be less than supply.

In some embodiments, the prediction algorithm 304 may output a destination location 306 where a vehicle should be parked in preparation for rental. For example, the prediction algorithm 304 may output a parking spot identifier associated with a parking facility 204. In some embodiments, once a vehicle sharing offer from a user is accepted, the vehicle sharing system 201 may select a destination location 306 for the vehicle to be parked, based on expected demand at the location. In some embodiments, the vehicle sharing system 201 may cause a vehicle to be moved back to a user location after sharing has been completed, for example, prior to a scheduled return time.

The prediction algorithm 304 may also determine predicted scores for optimal profitability for use of a vehicle at a number of locations and select a location with a maximum predicted score. For example, prediction algorithm 304 may determine a predicted score based on rental rates, borrowing rates, parking fees, and a likelihood of renting the vehicle at the location, among others. Scores may be determined for a particular vehicle at various locations and the vehicle may be caused to be moved to a location with a higher predicted score.

In some examples, the prediction algorithm 304 may automatically dispatch/route autonomous vehicles to be parked at a destination location 306 for rental use. For example, a vehicle may be taken from a user's apartment location in a suburb and moved to a particular parking location, such as at an airport, in order to meet an anticipated demand and/or for optimal profitability. In some embodiments, the prediction algorithm 304 may automatically dispatch/route autonomous vehicles (e.g., by generating and transmitting an instruction causing the autonomous vehicle to initiate and execute a designated route to a particular location, or to drive to an address of a particular parking lot and park there) to drive from an airport location to an apartment location on a weekend, for example, if it is determined by the prediction algorithm 304 that the probability of renting the vehicle on the weekend is higher at the apartment location. In some embodiments, the autonomous vehicle may be given an address of the destination location 306 and commanded to drive to the address. For example, the address and a command to reposition may be transmitted wirelessly by the vehicle sharing system 201 via network interface 111 to the autonomous vehicle, and may include an identifier and password (e.g. previously provided by the user/owner of the autonomous vehicle) to authorize the command. The address and command, once received by the autonomous vehicle, may be handled in a manner similar to a typical direct address entry, causing the autonomous vehicle to navigate to the entered address.

In some embodiments, prediction algorithm 304 may enable utilization of excess parking capacity available at a first location to fulfill demand at a second location, in a manner that optimizes profitability. For example, the prediction algorithm 304 may determine that demand at a second location will exceed the number of spaces available for parking at that location and may, in response, cause additional vehicles to be positioned at the first location. For example, the two locations may be near to each other, and one location may be used to handle excess capacity while enabling demand to be met at the other location.

In some embodiments where the prediction algorithm 304 identifies that a supply will not meet a vehicle demand, the vehicle sharing system 201 may identify and/or cause communications with fleet vendors 206 to fulfill the demand. For instance, a request to dispatch one or more fleet vehicles may be transmitted to a fleet vehicle computing system, such as fleet vendor 206. The fleet vendor may generate response data including bid or offer pricing information, for example, for a particular vehicle type (such as a sport utility vehicle (SUV)). In some embodiments, the fleet vendors 206 may bid or offer pricing information for a vehicle pool including more than one vehicle.

In some arrangements, the prediction algorithm 304 may enable utilization of excess/unutilized capacity at another company (such as a partner company, a competitor, or a traditional car rental company) near a requested location to fulfill demand at the location while optimizing profitability. In some embodiments, the partner may offer a vehicle rental at a pre-arranged rate.

In some examples, vehicle owners may submit offers in advance offering their vehicle and indicating the vehicle make, vehicle model, location, duration (start date to end date their vehicle is available for renting), and, based on the predicted demand and parking capacity at locations, the vehicle sharing system 201 may accept the offer and schedule a drop off location and time. This may optimize profitability in the sense that the vehicle can be parked at a location where there is a chance of it being rented out during the time the vehicle is made available.

Figure 4:
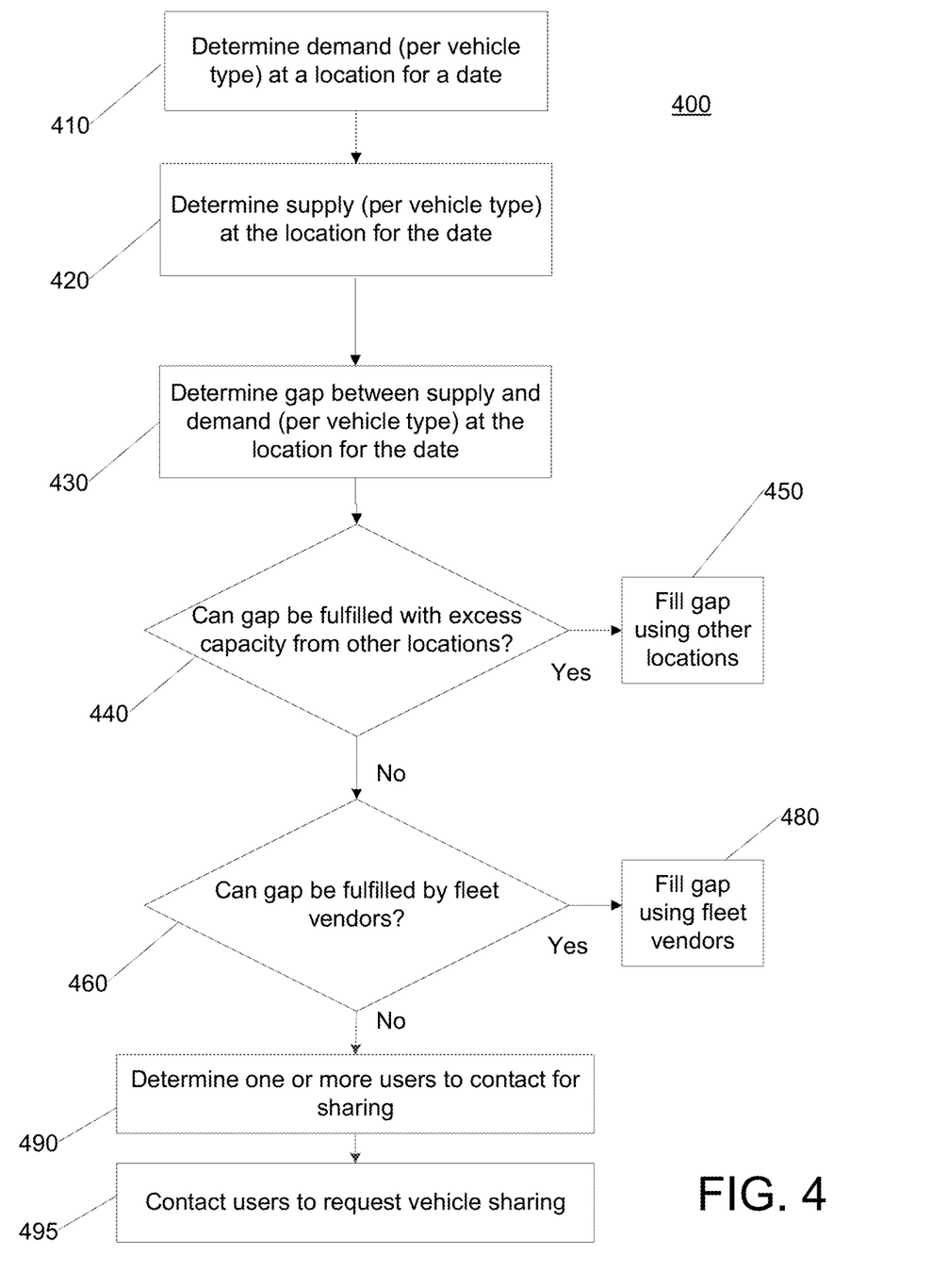
FIG. 4 illustrates an exemplary method for meeting a deficiency in vehicle supply in accordance with one or more aspects described herein.

FIG. 4 illustrates an example method 400 according to an embodiment as disclosed herein. In some embodiments, method 400 may be performed by vehicle sharing system 201. It should be understood that the method of FIG. 4 is designed to illustrate various features and aspects of the system, and not to limit the functionality of the system.

At step 410, vehicle demand, per vehicle type, may be determined for a location and for a particular date. For example, a number of full size sedans in demand or predicted to be in demand at a particular location, such as an airport, for a particular date may be determined. In some embodiments, vehicle demand may be known well ahead of time, since vehicle borrowers often plan ahead of their need and may make rental requests or reservations well ahead of their need date. Accordingly, the vehicle sharing system 201 may determine the vehicle demand based on reservations already received. In other embodiments, the vehicle sharing system 201 may determine the vehicle demand using methods, including methods implementing machine learning, as described above.

At step 420, vehicle supply, per vehicle type, may be determined for the location and for the particular date. For example, a number of full size sedans available for rental, at a particular location, such as an airport, for a particular date may be determined. The vehicle sharing system 201 may determine the vehicle demand using methods as described above.

At step 430, a gap between the supply and demand, per vehicle type, may be determined for the location and the particular date. Continuing the example, it may be determined that there is demand for ten full size sedans at a particular airport on a particular date, while there is a supply of only six full size sedans. Therefore, the gap between supply and demand may be calculated as 10−6=4 full size sedans.

At step 440, it may be determined whether or not the gap can be fulfilled using excess capacity from other locations. For example, prediction algorithm 304 may use the machine learning algorithms discussed above to determine that a nearby location has, or will have, a supply of full size sedans that is predicted to exceed the demand at the nearby location for the particular date. As discussed above, the machine learning algorithms may take as input information from the nearby location (e.g. information from one of the locations 303), factors 305, weather forecast 307, and vehicle sharing requests 302 and may determine whether the nearby location has, or will have, available full size sedans on the determined date.

If it is determined in step 440 that the gap can be fulfilled using the excess capacity, then at step 450 the gap may be filled using the vehicles from another location. For example, vehicles may be moved from the other locations and positioned at the location where the demand exceeds the supply. In some embodiments involving autonomous vehicles, the vehicle sharing system 201 may cause the vehicles to reposition to the location where the demand exceeds the supply (e.g., the system 201 may generate an instruction including a route from the current location of the vehicle to the desired location, may transmit the instruction to one or more autonomous vehicles and may execute or cause the instruction to execute by a computing device or system of the autonomous vehicle). In these embodiments, the vehicle sharing system 201 may issue a driving command to these vehicles, in order to cause the repositioning. In other embodiments, the vehicles may be driven or transported to the location to meet the gap in capacity at that location.

If it is determined at step 440 that the gap cannot be fulfilled using the excess capacity, at step 460, the vehicle sharing system 201 may determine whether the gap can be fulfilled by fleet vendors. If so, then at step 480, the vehicle sharing system 201 may cause fleet vendors to be contacted for providing vehicles to meet the demand. In these embodiments, various information may be provided to the fleet vendors by the vehicle sharing system 201, and information may be received from the fleet vendors. For example the vehicle sharing system 201 may send a request to fleet vendors and provide the fleet vendors with information related to vehicle type, date(s) needed, locations, etc. The fleet vendors may provide the vehicle sharing system 201 with information related to vehicle availability, pricing (as discussed above), locations of vehicles, and/or confirmation that certain vehicles will be provided.

If it is determined at step 460 that the gap cannot be met by the fleet vendors, then the vehicle sharing system 201 may, at step 490, determine one or more users to contact to request that they provide a vehicle for rental. In some examples, the one or more users may be determined from users who have previously provided a vehicle for sharing, such as a vehicle that is the same as, or similar to, the type demanded. For example, the vehicle sharing system 201 may query database 123 for all users who have previously provided a vehicle of the type demanded. In some other examples, the one or more users may be determined from users who have previously indicated a preference for being contacted to share a vehicle (e.g., an "opt-in" to the program). In some embodiments, the one or more users may be determined from users who are associated with an address in close proximity to the location. For example, the vehicle sharing system 201 may query database 123 for all users who registered with an address within five miles of the location. Accordingly, at step 495, the vehicle sharing system 201 may send a communication to one or more users to request that those users provide a vehicle for rental. For example, the vehicle sharing system 201 may send email(s) and/or text messages to one or more users. Various types of information may, in various embodiments, be included in the email or text message, including rental rate information, dates on which the vehicle is needed, rental duration requested, location(s) where the vehicle should be parked, and coupons for use in future rentals, among others.

In some embodiments, the vehicle sharing system 201 may, instead of, or in addition to, sending email and/or text messages, cause an offer to be posted to a web page, such as a web page hosted by a social networking site. In these embodiments, the offer may contain information related to the type of vehicle needed, the location where the vehicle is needed, the date(s) the vehicle is needed for, and/or various rewards, offers, and/or other benefits the user may be entitled to for providing the vehicle.

In some embodiments, step 440 and/or step 460 may be performed in reverse order, or skipped entirely. For example, the vehicle sharing system 201, after determining the gap between supply and demand, may next perform step 490 to determine one or more users to provide a vehicle, to be made available for rental. In some embodiments, two or more of steps 450, 480, and 490 may be performed in parallel. For example, the gap may be filled using a combination of vehicles from fleet vendors and from users.

Figure 5:
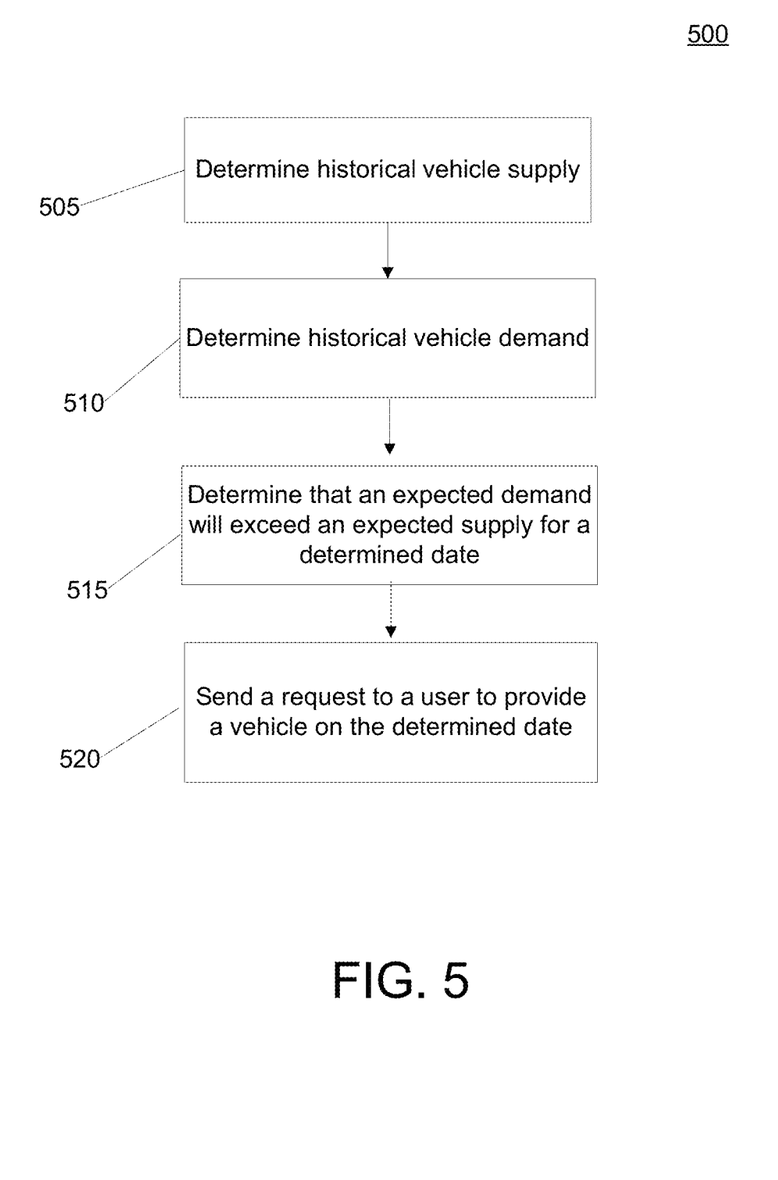
FIG. 5 illustrates an exemplary method for meeting a deficiency in vehicle supply in accordance with one or more aspects described herein.

FIG. 5 depicts an example method 500 according to an embodiment as disclosed herein. In some embodiments, method 500 may be performed by vehicle sharing system 201. It should be understood that the method of FIG. 5 is designed to illustrate various features and aspects of the system, and not to limit the functionality of the system.

At step 505, a historical vehicle demand may be determined. For example, the vehicle sharing system 201 may retrieve information from database 123 relating to past rentals of various vehicles for one or more locations.

At step 510, a historical vehicle supply may be determined. For example, the vehicle sharing system 201 may retrieve information from database 123 relating to various vehicles made have previously been made available for rental at one or more locations.

At step 515, it may be determined that an expected demand will exceed an expected supply for a determined date. In some embodiments, the determination may be based on the historical vehicle demand and/or the historical vehicle supply.

If it is determined that the expected demand will exceed the expected supply, at step 520, a request may be sent to one or more users to supply a vehicle for rental.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
  determining, by a computing device, historical vehicle supply data representing vehicle sharing offers from a plurality of users in response to a request for a vehicle at a particular date and a location;

determining, by the computing device, historical vehicle demand data representing vehicle sharing requests;

generating, by the computing device executing a machine learning algorithm, prediction data using the historical vehicle supply data, the historical vehicle demand data, the request, and one or more factors, the prediction data including an expected vehicle supply and an expected vehicle demand for the particular date at the location, the one or more factors including expected capacity utilization data at the location per one or more of a vehicle type, duration, day of a week, and month of a year;

determining, by the computing device using the prediction data, that, for the particular date at the location, the expected vehicle demand will exceed the expected vehicle supply;

determining, by the computing device, whether a gap between the expected vehicle demand and the expected vehicle supply can be filled by at least one of an additional location or one or more fleet vendors;

receiving real-time parking availability data acquired from one or more sensors of one or more parking facilities;

automatically generating a route from a current location of the vehicle to a parking location based on the real-time parking availability data;

generating, in response to at least one of the additional location or the one or more fleet vendors not being able to fill the gap, a vehicle sharing request to provide the vehicle for sharing on the particular date, the vehicle sharing request including the particular date and the route to the parking location;

sending, to at least one computing device associated with the vehicle, instructions to cause the at least one computing device associated with the vehicle to control the vehicle to drive along the route to the parking location in accordance with the vehicle sharing request, the vehicle being an autonomous vehicle.

2. The method of claim 1, wherein the machine learning algorithm is trained on the historical vehicle supply data and the historical vehicle demand data.

3. The method of claim 1, further comprising:
determining a weather forecast for the particular date, wherein the determining that the expected vehicle demand will exceed the expected vehicle supply is further based on the determined weather forecast.

4. The method of claim 1, further comprising:
determining an event planned for the particular date, wherein the determining that the expected vehicle demand will exceed the expected vehicle supply is further based on the determined event, and wherein the determined event comprises a conference or a sporting event.

5. The method of claim 1, wherein the expected vehicle demand is associated with the location, the method further comprising:
determining the at least one computing device based on a proximity of an address associated with the at least one computing device to the location.

6. The method of claim 1, wherein the request is associated with the vehicle type, the method further comprising:
determining the vehicle at has previously been provided and is the vehicle type.

7. The method of claim 1, further comprising:
sending, to the one or more fleet vendors, the vehicle sharing request to provide the vehicle on the particular date.

8. The method of claim 1, wherein the one or more factors further include one or more of:
expected supply rate data at the location per one or more of the vehicle type, duration, day of the week, and month of the year;
parking capacity at the location;
expected demand rate due to a planned event near the location per one or more of the vehicle type, the duration, and the day of the planned event; and
vehicle rental rates per one or more of the location, the day of the week, and the month of the year;
wherein the historical vehicle demand data includes demand rate data at the location for one or more of the vehicle type, the duration, the day of the week, and the month of the year; and
wherein the historical vehicle supply data includes supply rate data at the location for the one or more of the vehicle type, the duration, the day of the week, and the month of the year.

9. An apparatus, comprising:
a processor;
a memory unit storing computer-executable instructions including a machine learning algorithm, which when executed by the processor, cause the apparatus to:
determine historical vehicle supply data representing vehicle sharing offers from a plurality of users in response to a request for a vehicle at a particular date and a location;
determine historical vehicle demand data representing vehicle sharing requests;
generate prediction data by performing machine learning analysis of the historical vehicle supply data and the historical vehicle demand data, the prediction data including an expected vehicle supply and an expected vehicle demand for the particular date at the location based on the historical vehicle supply data, the historical vehicle demand data, the request, and one or more factors, the one or more factors including expected capacity utilization data at the location per one or more of a vehicle type, duration, day of a week, and month of a year;
determine using the prediction data that, for the particular date at the location, the expected vehicle demand will exceed the expected vehicle supply;
determine whether a gap between the expected vehicle demand and the expected vehicle supply can be filled by at least one of an additional location or one or more fleet vendors;
receive real-time parking availability data acquired from one or more sensors of one or more parking facilities;
automatically generate a route from a current location of the vehicle to a parking location based on the real-time parking availability data;
generate, in response to at least one of the additional location or the one or more fleet vendors not being able to fill the gap, a vehicle sharing request to provide the vehicle for sharing on the particular date, the vehicle sharing request including the particular date and the route to the parking location;
send, to at least one computing device associated with the vehicle, instructions to cause the at least one computing device associated with the vehicle to control the vehicle to drive along the route to the parking location in accordance with the vehicle sharing request, the vehicle being an autonomous vehicle.

10. The apparatus of claim 9, wherein the instructions, when executed by the processor, further cause the apparatus to:
determine a weather forecast for the particular date, wherein the determining that the expected vehicle demand will exceed the expected vehicle supply is further based on the determined weather forecast.

11. The apparatus of claim 9, wherein the instructions, when executed by the processor, further cause the apparatus to:
determine an event planned for the particular date, wherein the determining that the expected vehicle demand will exceed the expected vehicle supply is further based on the determined event, and wherein the determined event comprises a conference or a sporting event.

12. The apparatus of claim 9, wherein the expected vehicle demand is associated with the location, wherein the instructions, when executed by the processor, further cause the apparatus to:
determine the at least one computing device based on a proximity of an address associated with the at least one computing device to the location.

13. The apparatus of claim 9, wherein the expected vehicle demand is associated with the vehicle type, wherein the instructions, when executed by the processor, further cause the apparatus to:
determine the vehicle has previously been provided and is the vehicle type.

14. The apparatus of claim 9, wherein the instructions, when executed by the processor, further cause the apparatus to:
send, to the one or more fleet vendors, the vehicle sharing request to provide the vehicle for sharing on the particular date.

15. One or more non-transitory computer-readable media storing instructions that, when executed by a computing device, cause the computing device to:
determine historical vehicle supply data representing vehicle sharing offers from a plurality of users in response to a request for a vehicle at a particular date and a location;
determine historical vehicle demand data representing past vehicle sharing requests;
generate prediction data by performing machine learning analysis of the historical vehicle supply data and the historical vehicle demand data, the prediction data including an expected vehicle supply and an expected vehicle demand for the particular date at the location based on the historical vehicle supply data, the historical vehicle demand data, the request, and one or more factors, the one or more factors including expected capacity utilization data at the location per one or more of a vehicle type, duration, day of a week, and month of a year;
determine using the prediction data that, for the particular date at the location, the expected vehicle demand will exceed the expected vehicle supply;
determine whether a gap between the expected vehicle demand and the expected vehicle supply can be filled by at least one of an additional location or one or more fleet vendors;
receive real-time parking availability data acquired from one or more sensors of one or more parking facilities;
automatically generate a route from a current location of the vehicle to a parking location based on the real-time parking availability data;
determine at least one computing device associated with a vehicle that has been previously provided for sharing;
generate, in response to at least one of the additional location or the one or more fleet vendors not being able to fill the gap, a vehicle sharing request to provide the vehicle for sharing on the particular date, the vehicle sharing request including the particular date and the route to the parking location;
send, to the at least one computing device associated with the vehicle, instructions to cause the at least one computing device associated with the vehicle to control the vehicle to drive along the route to the parking location in accordance with the vehicle sharing request, the vehicle being an autonomous vehicle.

16. The one or more non-transitory computer-readable media of claim 15, storing additional instructions that, when executed by the computing device, further cause the computing device to:
send, to the one or more fleet vendors, the vehicle sharing request to provide the vehicle for sharing on the particular date.

* * * * *